(12) United States Patent
Beard

(10) Patent No.: US 7,925,673 B2
(45) Date of Patent: Apr. 12, 2011

(54) METHOD AND SYSTEM FOR KNOWLEDGE BASED COMMUNITY SOLUTIONS

(76) Inventor: Jon Beard, Raleigh, NC (US)

( * ) Notice: Subject to any disclaimer, the term of this patent is extended or adjusted under 35 U.S.C. 154(b) by 366 days.

(21) Appl. No.: 11/581,653

(22) Filed: Oct. 16, 2006

(65) Prior Publication Data

US 2008/0091686 A1  Apr. 17, 2008

(51) Int. Cl.
G06F 7/00 (2006.01)
G06F 17/30 (2006.01)
(52) U.S. Cl. .................................. 707/802; 707/758
(58) Field of Classification Search ............. 707/104.1, 707/802, 758
See application file for complete search history.

(56) References Cited

U.S. PATENT DOCUMENTS

| | | | |
|---|---|---|---|
| 6,438,580 B1 | 8/2002 | Mears et al. | |
| 6,439,893 B1 | 8/2002 | Byrd et al. | |
| 6,807,558 B1 | 10/2004 | Hassett et al. | |
| 7,082,418 B2 | 7/2006 | Levy et al. | |
| 2002/0128894 A1 | 9/2002 | Farenden | |
| 2002/0138456 A1 | 9/2002 | Levy et al. | |
| 2003/0036046 A1* | 2/2003 | Smolover ..................... | 434/350 |
| 2003/0114943 A1 | 6/2003 | Byrd et al. | |
| 2003/0219710 A1* | 11/2003 | Suiter et al. .................. | 434/350 |
| 2004/0219493 A1 | 11/2004 | Phillips | |
| 2005/0096973 A1 | 5/2005 | Heyse et al. | |
| 2006/0031087 A1 | 2/2006 | Fox et al. | |
| 2006/0190303 A1* | 8/2006 | Yourist et al. ................ | 705/3 |
| 2007/0020604 A1* | 1/2007 | Chulet ......................... | 434/350 |

OTHER PUBLICATIONS

Gandon: "Distributed Artificial Intelligence and Knowledge Management: Ontologies and Multi-Agent Systems for a Corporate Semantic Web", Scientific Philosophy Doctorate Thesis in Informatics, INRIA and University of Nice, Nov. 7, 2002.*
Gandon: "Distributed Artificial Intelligence and Knowledge Management: Ontologies and Multi-Agent Systems for a Corporate Semantic Web", Scientific Philosophy Doctorate Thesis in Informatics, INRIA and University of Nice, Nov. 7, 2002.*

* cited by examiner

Primary Examiner — Kuen S Lu
(74) Attorney, Agent, or Firm — Vincent K. Gustafson; Hultquist IP

(57) ABSTRACT

Systems and methods for providing knowledge and online access to knowledge resources to users are disclosed. Features embodied in various embodiments include: 1) linking members of communities with mentors and subject matter experts that can help the member derive value from their online experience; 2) assessing and delivering online knowledge at a participant level; 3) pushing knowledge resources to participants based on the participant profile; 4) creating and updating an online personal growth plan; and 5) tracking value by participant or by community, as required by community leadership.

36 Claims, 7 Drawing Sheets

Fig. 7

:: Welcome... Peter Kline :: You are here >> Home

Search:
[Search] Advanced Search

○ Site
○ Web
○ Experts
○ Industry Ambassador

Notification
- New items in My Catalog(2)
- New items in Catalog (10)
- Missed Dates (1)
- Event Registrations (2)
More...

Poll - 1 of 3
Have you visited your local public service center?
○ Yes
○ No

Recently Accessed

| Title ↓ | Content Type | Status | Actions |
|---|---|---|---|
| Fire Dept. - Webinar | Event | Completed | Start \| Report \| Details \| Notes |
| Health Awareness | Course | In-Progress | Start \| Report \| Details \| Notes |
| Public Service Chat | Chat | In-Progress | Start \| Report \| Details \| Notes |
| Fireman Interview | Audio | In-Progress | Start \| Report \| Details \| Notes |
| Public Service | Video | Completed | Start \| Report \| Details \| Notes |
| Fire trucks - Types & Configurations | Web | Completed | Start \| Report \| Details \| Notes |

Announcements

| Title ↓ | Date |
|---|---|
| Mt. Orab gets new fire trucks | 12-01-05 |
| Public Service Volunteer Opportunities in the New England Division | 09-18-05 |
| New Public Service Career Webinar Scheduled 1/15/06 - 8:00pm EST | 01-01-05 |

More...

Discussion Boards

| Title ↓ | Replies | Posted By | Actions |
|---|---|---|---|
| Pros and Cons of being a Fire Person | 5 | Adam | Reply |
| How do you recognize if you should be involved in public service? | 3 | Maria | Reply |
| How dangerous is firefighting? | 4 | Lincoln | Reply |

More...

My Calendar
January 2006
S M T W T F S
  1  2  3  4  5  6  7
8  9 10 11 12 13 14
15 16 17 18 19 20 21
22 23 24 25 26 27 28
29 30 31

Web Links
- Fire News
- NYC Fire Department
- New York City
- 911 Tribute
More...

Quick Links
- Contact My Mentor
- Chat (MSN/Skype)
More...

US 7,925,673 B2

METHOD AND SYSTEM FOR KNOWLEDGE BASED COMMUNITY SOLUTIONS

BACKGROUND OF THE INVENTION

1. Field of the Invention

The present invention relates generally to an online tool for providing knowledge and access to knowledge resources to users. Further, the present invention relates to an online tool for: 1) linking members of communities with mentors and subject matter experts that can help the member derive value from their online experience; 2) assessing and delivering online knowledge at a participant level; 3) pushing knowledge resources to participants based on the participant profile; 4) creating and updating an online personal growth plan; and 5) tracking value by participant or by community, as required by community leadership.

2. Description of the Prior Art

Towns, cities and counties are pushing towards providing internet connectivity for all of their residents. This is aimed at creating awareness in the communities about technologies available. This will help to open the small communities so its residents can interact with the outside world to gain knowledge and expertise about fields unknown to them. However, by providing internet connectivity and computer access without the right tools, this goal will not be fulfilled.

Therefore, what is needed is a tool that will benefit citizens of communities particularly those economically disadvantaged citizens. Targeted citizens can be at risk students, elementary school students, middle school students, high school students, college students, retired persons, persons desiring to re-tool their career, persons without jobs, and small business entrepreneurs.

Communities may consist of counties, cities or towns. Other communities may be a formal or informal group of persons aligned to take advantage of the tool in the claim. This tool should provide mentoring capabilities to the residents so that the residents can connect with people both within their own communities and in different cities and regions to learn from their experiences and derive benefits from their knowledge in specific areas of interest. This tool should also have features that allow the residents to receive information based on their interest areas and collaborate with other users in order to gain knowledge. Further, this tool should have the ability to allow online educational content to be delivered to the residents based on their areas of interest.

U.S. Patent Application Publication No. 20060031087 titled "Mentor-ProtégéMatching System and Method" by Fox et. al. describes one such tool. This application describes a method and a system for matching a protégé with a mentor on the basis of profiles of the protégé and the mentors. The system of this patent application provides training materials and tutorials for its participants based on the profile of the participants. Participants also receive the customized and coaching curricula via email. This system is specifically developed for use by early college students to find seniors, graduate students and working professionals as mentors.

Another such tool is described in U.S. Pat. No. 6,438,580 titled "System and a Method for an Interactive Knowledgebase" by Mears et. al. This patent describes an interactive knowledgebase that stores information in multiple categories. The information is searchable by users of the system. The knowledgebase also stores a discussion group for each category. Each category also has a user that serves as an expert for that category. This user posts replies to questions in the discussion group. Hence, users can interact with an expert through a forum. The users must manually find a forum that contains discussions on their areas of interest and then initiate a conversation with the subject matter expert.

U.S. Patent Application Publication No. 20040219493 titled "Interactive Learning and Career Management System" by Phillips describes a system for providing information to a user by searching for information from multiple sources. A profile for each user is created, and based on the profile, searches for information on each user are carried out automatically. These results are then pushed out to the user.

Although the above listed documents mention systems and methods that individually provide a part of the tools required for solving the problem as discussed, there is no technology that combines the tools listed above and others to provide a complete tool for the described problem. Hence, there is a need for a tool that will not only match users with mentors and subject matter experts so that the users can derive knowledge on their areas of interest from interactions with the mentors and the subject matter experts, but also assess and push Internet based information and educational content to users so that the users can develop knowledge and skills necessary for their areas of interest. This tool should have the necessary technology to allow the users to collaborate with the mentors and subject matter experts and other users via online messaging, voice conferencing, video conference and remote application sharing.

SUMMARY OF THE INVENTION

The present invention provides an online tool for providing knowledge and access to knowledge resources to users.

A first aspect of the present invention is to provide a method for providing an interactive knowledge based community solution, the community comprising multiple users, each of the multiple users belonging to a user type, the user types including participant, mentor and subject matter expert, the method including the steps of:
  associating a user profile with at least one of the multiple users;
  matching a participant user with a mentor user based on the user profiles of the participant user and the mentor user;
  matching a participant user with at least one subject matter expert user based on the profile of the participant and the subject matter experts;
  providing an interface for allowing at least one user to interact with at least one other user; and
  wherein the interface is customized to each of the multiple users such that it displays personalized content to each user that is selected on the basis of the user profile of each of the multiple users.

A second aspect of the present invention is to provide a system for providing an interactive knowledge based community solution, the community including multiple users, each of the multiple users belonging to a user type, the user types comprising participant, mentor and subject matter expert (SME), the system including:
  at least one database for storing a list of registered users having access to the system and a user profile associated with each user;
  a server for providing access to personalized portals for the registered users;
  a mentor matching module for matching a participant user with a mentor user based on user profiles of the participant user and the mentor user;
  an SME matching module for matching a participant user with a subject matter expert user based on user profiles of the participant user and the subject matter user;

an interface module (chat, VOIP and threaded discussion) for at least one user to interact with at least one other user; and a content module for providing each of the multiple users with personalized content that is selected on the basis of the user profile of each of the multiple users.

Thus, the present invention provides an online tool for: 1) linking members of communities with mentors and subject matter experts that can help the member derive value from their online experience; 2) assessing and delivering online knowledge at a participant level; 3) pushing knowledge resources to participants based on the participant profile; 4) creating and updating an online personal growth plan; and 5) tracking value by participant or by community, as required by community leadership.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 7 is a schematic of a personalized portal, in accordance with an embodiment of the present invention.

DETAILED DESCRIPTION

Figure 1:
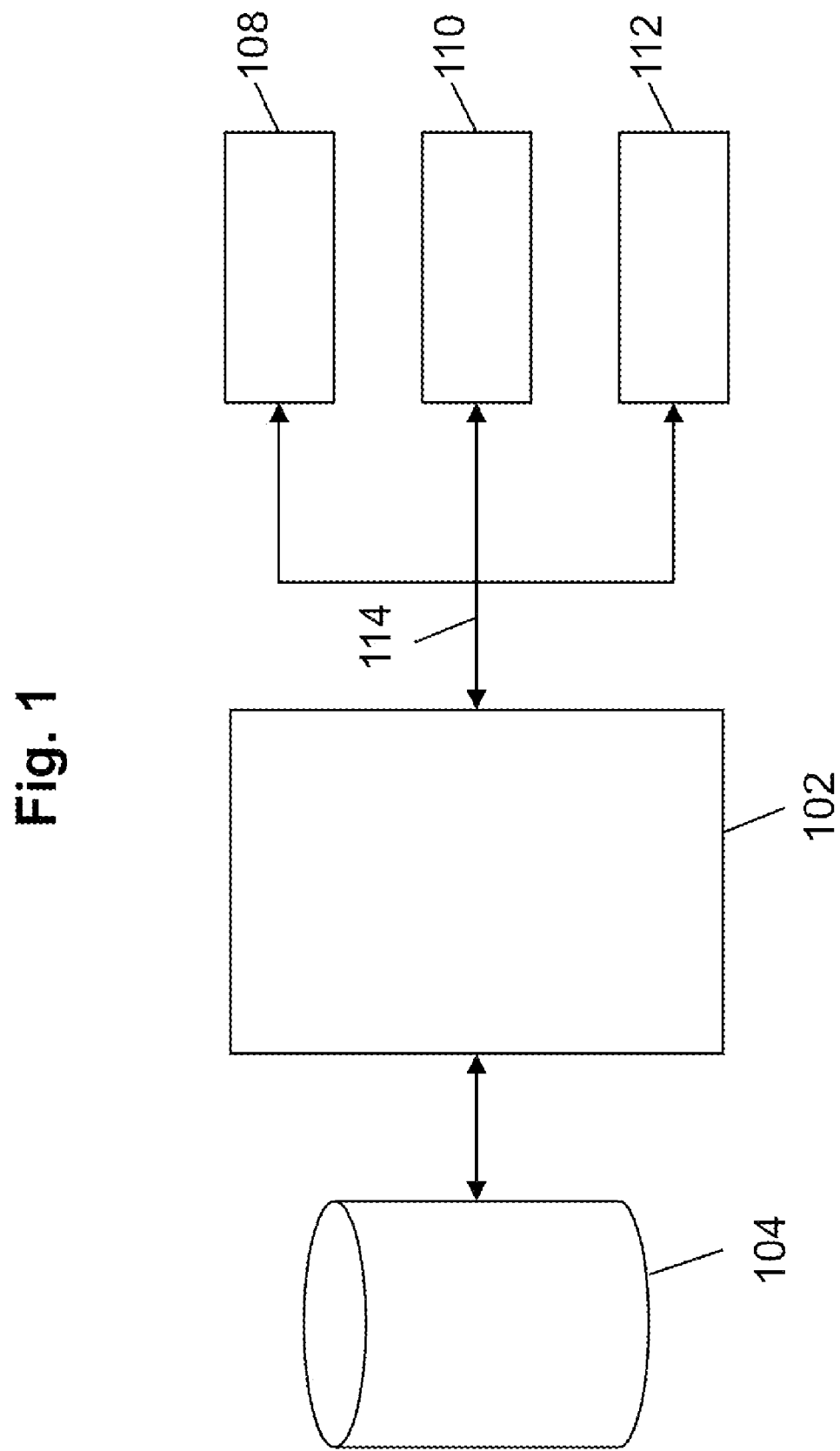
FIG. 1 is a schematic of the overall system, in accordance with an embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

The present invention provides a knowledge based solution for residents of communities. A community can be defined as a city, county, state, country or a group of people that are bound together by geographic boundaries. Alternatively, a community can also be defined as a group of people that are bound together by other commonalities, such as profession, race, socio-economic class, retirement communities, education communities, military communities, or other such aspects. The knowledge based community solution of the present invention allows for users of the communities to access information and resources that may not be traditionally available to them. These users include mentors and subject matter experts that help community participants to find new areas of interest, provide information and guidance in areas of interest that the users may already have, and develop skills relative to individual areas of interest. The resources also include information such as news and data. It may also include articles that are published online.

The knowledge based solution of the current invention also delivers educational content including but not limited to online courses, seminars, lectures, discussions and podcasts to members of the communities. By providing access to information and resources to users of communities, the present invention provides the users of the communities with opportunities to learn about new options that they can explore. By using this tool they can change careers, get in-depth knowledge about college, and learn from the people who can be regarded as subject matter experts.

There are three base user types with which most users of the present invention are associated. The base user types are participant, mentor, subject matter expert (SME), sponsor, administrator, community leader, and industry partner. The participant, SME and mentor each has a user profile associated with him/her. This profile is used to match the information and the resources that are available for the participants and matching participants with mentors and subject matter experts, among other things. The profile for participant users also includes specific areas of interest and a general user type (student/level, retiree, unemployed, retooling, economically disadvantaged, etc.). These areas of interest specify the participant's target area, in which he/she may be interested. For example, one participant may specify firefighting as an area of interest. The present invention will then provide this participant with information relating to firefighting. The participant will be matched up with a subject matter expert who is either a firefighter or is related to this profession. The participant will also have access to online courses that may be required for someone to become a firefighter. There may be seminars, online lectures that are related to the firefighting profession that will be presented to the participant. Hence, the participant will have access to resources and information that would have not been traditionally available to the participant.

The solution of the present invention will be provided to communities and their residents. With the help of this solution the residents or participants will be able to interact and communicate with other users, mentors and subject matter experts that are either from the same community or from different shared communities. Each community will have the ability to share community resources or not. The solution automatically generates a personal portal for each participant and helps them define their interests, hobbies, learning needs, career goals, and will lead them to specific internet web sites (text, audio, video) for extended knowledge and information as determined by their assessed sets of needs. The assessed sets of needs are stored as part of a personal profile of the participants. The profile contains personal information and demographic information. It also contains information that is necessary to develop a set of needs, objectives and goals for the resident. This may include educational information, past and present work related experience and other professional and personal information. The profile also stores target areas of interest for the participants. This profile forms the basis of the information that is displayed to the participants. The portal is personalized for each participant on the basis of the profile of the participant accessing the portal.

When a participant accesses the online Internet system for the first time, the participant is presented with a form having fields to fill out. These fields comprise elements of the user profile. After a participant completes his/her user profile, a mentor will be assigned to the participant. The assignment is automatic and is on the basis of the participant's profile and the mentor's profile. Each participant will have only one assigned mentor, although each mentor may have been assigned to many participants. The user profile of the mentor will also have preferences specifying the number of participants that he/she can mentor, the number of hours the mentor can devote per week and other measures that will be utilized and tracked for the purpose of matching participants with mentors. The participants have the ability to search for subject matter experts in their interest areas. The subject matter expert can be a single contact or there may be multiple contacts based on the discussion and follow-up. Hence, each participant can be connected with multiple subject matter experts at any given time, and vice-versa. The method for matching the participant and a mentor is to determine a similar background (a student participant may be assigned an individual from education; a participant re-tooling a career may be assigned a mentor from industry). Up to three (3) paired subsets of NAICS (industry) codes and SOC (occupation) codes are assigned by the participants to their interest areas. At least one NAICS code or one SOC code must be identified by the participant. The mentor or SME will identify similar representative codes for their work experience. In addition, the system will use the participant's type to further match the mentor with the participant. Mentors are selected by background in education, public service, or industry. NAICS and SOC codes have 4 levels each. SME experts are selected by matching at the lowest level first and then subsequent levels until a match is found for SOC code first and then NAICS code as applicable for the pair.

The current invention is designed to be implemented in multiple communities. Mentors and subject matter experts, who use the system, can be from various communities. A user of role type community partner is present for each community that is represented. The community partners can specify if the mentors and subject matter experts, from their community will be available for participants from other communities. This can be specified either as available to all communities, available to specific listed communities, or keep as private to own community. Community partner is another role that a user can have, apart from the three basic roles or user types discussed before. A user can have one or more multiple roles or user types. For example, a user that is a mentor can also be a subject matter expert, and/or a community partner.

The solution of the current invention also serves as a communication portal between the participants and the mentors and/or subject matter experts. The participants can communicate with the mentors and the subject matter experts by using collaboration tools that are provided by the portal. The collaboration tools include a chat tool that allows multi-party text based communication. The chat tool records the chat histories, and these are available to the users involved in the chat for future reference. The chat histories are also stored and are accessible to administrators for auditing purposes. The collaboration tool also provides for virtual collaboration between users, such as remote application sharing for demonstration purposes, voice over IP implemented voice conferencing and telephony features and online webinars. A webinar can be between a subject matter expert and one participant or multiple participants. The webinar can be recorded and stored, so that it is accessible in the future to those participants that missed the live webinar. Commonly used applications such as those for word processing, spreadsheets, databases, graphics suites and other programs are also available to the users via a hosted interface. This allows the users to access these applications without purchasing and installing them on their local systems.

The system also acts as a repository of information and content that can be delivered to users. The content includes news, URL content and online courses that are stored as course catalogs. This aggregated information is collectively referred to as a learning management system. This acts as a resource library for the users. Information from this library is delivered to participants, in a push type system or by selection. The system has the ability to provide core online resources to participants and/or to allow participants to browse, select and purchase individual courses, as desired, using a shopping cart process. This means that the system actively searches for content that can be delivered to participants on the basis of the user profile and areas of interest of the participants. The matched information is then automatically shown on the personalized portals of the participants. Hence, the portal will display personalized information that is unique for each participant. In another embodiment, the learning management system searches for information and content based on user profile data. The learning management system searches for information on sources such as the Internet and other online information databases. Apart from pushing information to the participants, the learning management system is also searchable by interest area and keywords. The participants can traditionally search the learning management system for information that may not have been delivered to them, or for information that may not fall under the areas of interest specified by the participants. Online courses and events are pushed to participants based on their profile and also cataloged and stored for future reference. These are also searchable by areas of interest and keywords.

As mentioned above, the data stored in the learning management system is meta-tagged by interest areas and keywords for searches by participants. The learning management system also stores podcasts, video events, other audio files, any media such as news articles, documents, graphics, URLs, web pages. A role of the sponsor user is to review all content for suitability and value, tag content for search criteria and add the content to the catalog. Mentors, subject matter experts, and participants can submit content to the sponsor for approval and access in the learning management system. Similar to the provision of sharing mentors and subject matter experts between communities, the content in the learning management system can be shared between communities or kept private for each community. This is also specified by community partners, as discussed above. Additional educational content, such as e-courses and e-learning modules can be added to the learning management system. In one embodiment, each community is provided with an upper limit of content that can be added by its sponsors. If content is added in-excess to these limits, the community is provided the option of purchasing the content.

The invention delivers educational and other informational content to the participants. It also directs the participants to mentors and subject matter experts for assistance and guidance. It also provides communities with the ability to assess participants and other users for level of knowledge using polling or cataloged online assessments. These allow the community partners to asses the impact of providing the online content to its participants. It also lets the partners and other users assess the benefit the participants are experiencing from the content. One way of assessing is via polling. Participants that enroll for an online course or similar content are polled after they complete the course. They are polled to derive the value of the course that they completed.

The online course and lectures also have an assessment module at the end. This allows for conducting a more traditional testing type assessment, on the content of the course. This allows the community to derive measures and statistics of the current level of knowledge of its residents on certain subjects, technical or non-technical. The ability to assess participants is an important feature of the present invention and has many valuable uses. For example, this feature is valuable for communities trying to attract industry to their area. Community partners can first deliver courses that would be important for its participants to gain work in that target industry. After the participants have completed the courses, the community can assess the participants and deliver the assessment results to the target industry. These results may show a high availability of skilled labor or other skill sets in the community and put a strong case for the industry to move to that community.

Apart from providing polling and assessment, the current invention is also capable of tracking usage of the system by participants, mentor, subject matter experts and other user types. The usage is tracked to report to the community partners is used and to monitor participant, mentor and SME participation. The tracking is not meant to spy or record the activities of the users, but is meant for auditing purposes and for generating high level reports from the recorded data. For the participant users, usage is tracked for online courses taken, assessments completed (with scoring if available), webinars attended, mentor or subject matter expert meetings, time logged in, number of times logged in and messaging transcripts. For mentors and subject matter experts, the number of hours in meetings with participants, hours logged in, number of times logged in and all messaging activity is logged. For other user types, usually the number of hours in meetings, number of hours logged in, number of times logged in and messaging activities are recorded. Other parameters may also be recorded without deviating from the scope of the invention.

Tracking the usage of the participants is also important for recording their progress and growth. A participant can create a personal growth plan. The growth plan usually includes short term and long term goals and milestones. The participant progresses forward in his or her growth plan by interacting with mentors, SMEs, accessing online educational content and viewing other content available to him or her. The participant can track his or her progress and check off completed milestones or tasks from the growth plan.

Apart from the three listed user types, there are some other ancillary user types or roles that can access the system. These include Administrator, Sponsor, Community Leader, and Industry Partner. The administrator can add or delete users; perform administrative tasks such as override exceptions and other maintenance related issues. The sponsor usually reviews and approves the participants, mentors, and subject matter experts. It also approves, metatags and puts resource content in the catalog of the learning management system for availability to these user types. A community leader is provided access to reporting for the participants under their control in the community. They are typically the funding resource for the system. An industry partner is a person who has ties with certain industries and the communities. It is the primary contact for opportunities like jobs, internships, interviews and other career related information for that particular industry. They also typically will provide mentors and subject matter experts for the community.

The various modules and functionality of the present invention have been described in detail. Referring now to the drawings in general, the illustrations are for the purpose of describing a preferred embodiment of the invention and are not intended to limit the invention thereto. As best seen in FIG. 1, which is a schematic of the overall system in accordance with an embodiment of the present invention, server 102 is connected to database 104. Server 102 connects to terminals 108, 110 and 112 via network 114. Server 102 processes requests from clients and interacts with database 104. Network 114 is the Internet, local area network, wireless network, mobile network or a similar network that allows clients to communicate with server 102 and exchange data. Terminals 108, 110, 112 include devices that are capable of interfacing with server 102 over network 114 such as personal computers, laptops, PDA's and cell phones to view portals.

Figure 2:
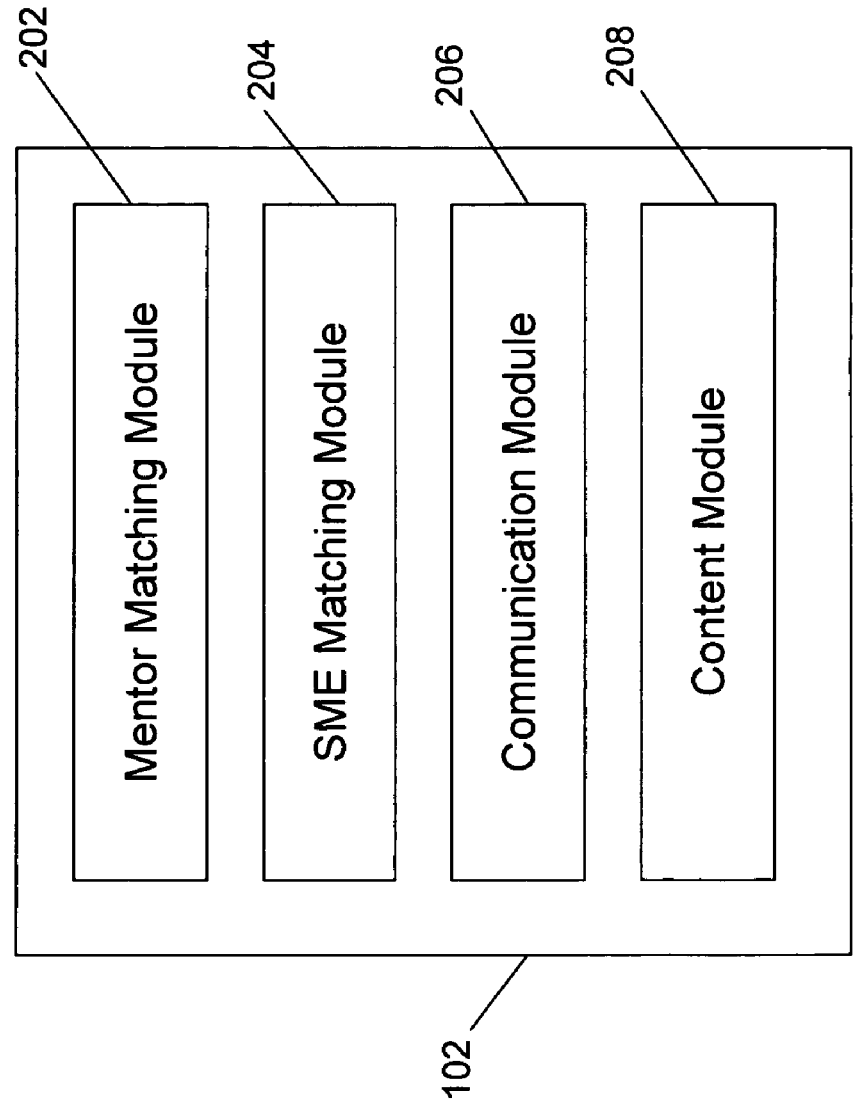
FIG. 2 is a schematic of the various modules, in accordance with an embodiment of the present invention.

FIG. 2 is a schematic of the various modules, in accordance with an embodiment of the present invention. Server 102 comprises various modules that carry out specific features of the invention. These modules include mentor matching module 202, SME (Subject Matter Expert) Matching Module 204, Communication Module 206 and Content Module 208. Additional modules contemplated by the present invention include a Learning Module, Personal Growth Plan Module, Polling Module, Opportunities Module, Internet Data Mining Module, and Resource Module. There are other features of the invention that may be implemented by other modules, or grouped together into these modules. It will be apparent to one skilled in the art that there may be other modules possible.

Figure 3:
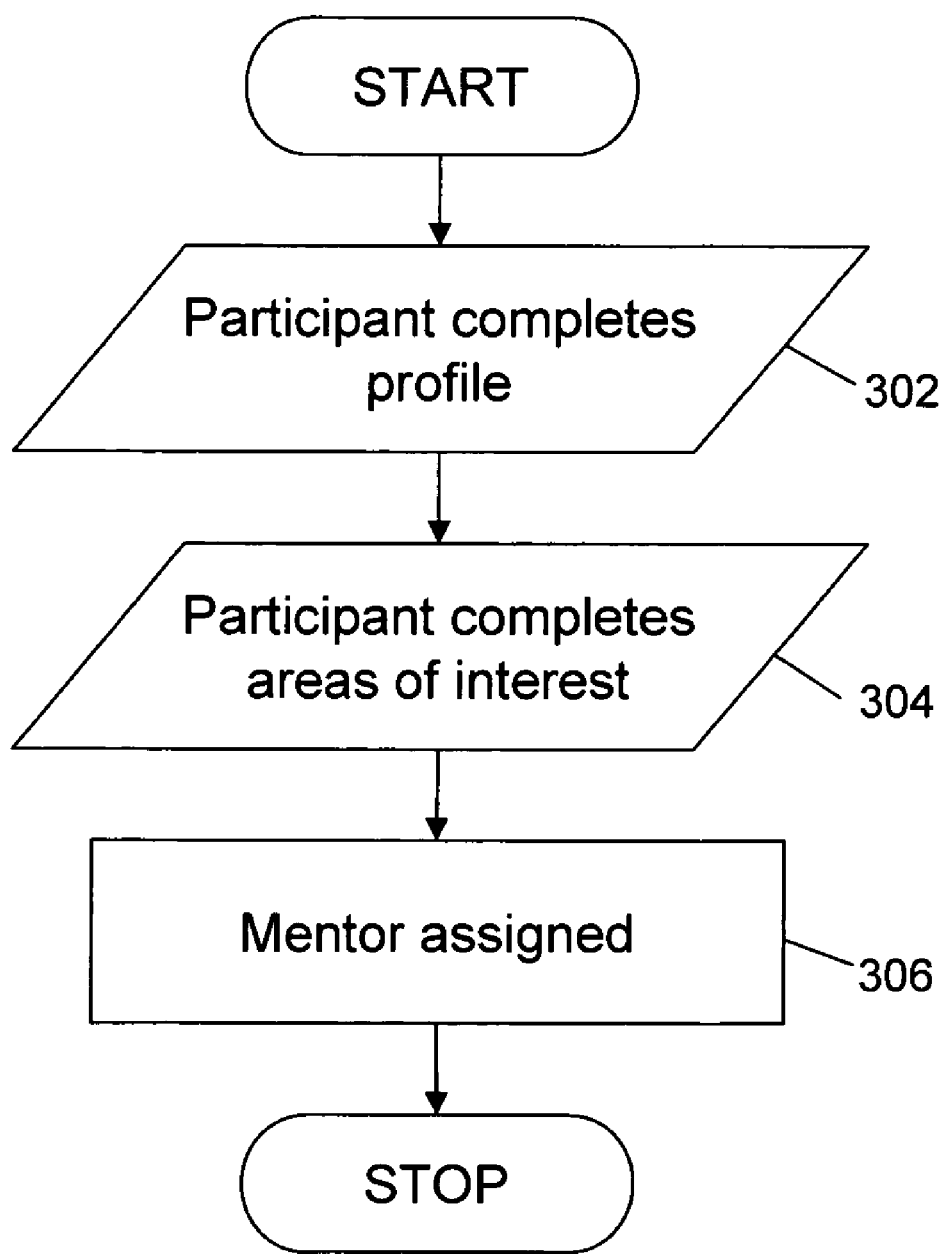
FIG. 3 is a flowchart depicting the steps of assigning a mentor to a participant, in accordance with an embodiment of the present invention.

FIG. 3 is a flowchart depicting the steps of assigning a mentor to a participant, in accordance with an embodiment of the present invention. In order to be assigned to a mentor, a participant first needs to complete the user profile. This is depicted at step 302. At step 304, the participant also inputs areas of interest. This step in not required for mentor assignment. Mentor matching module 202 uses the user profile saved by the participant and searches for mentors in database 104. Mentor module searches for mentors on the basis of user profiles of mentors and current usage of mentor, then selects the mentor whose profile best matched with the participant's profile and has availability. If a mentor is not available, the sponsor is assigned as the mentor. This is depicted at step 306. After a participant is matched with a mentor, the participant can communicate with his/her assigned mentor. The server provides tools for allowing this communication, via communication module 206. Typical tools include but are not limited to chat, voice communication using voice over internet protocol or other voice communication means, application sharing and web conferencing. The mentor matching module allows only one mentor per participant. However, in cases the participant may need to be matched with a second mentor. This may be if the first mentor is no longer available, or there are some issues between the participant and the mentor. Such deviations are allowed and are properly within the scope of the present invention.

Figure 4:
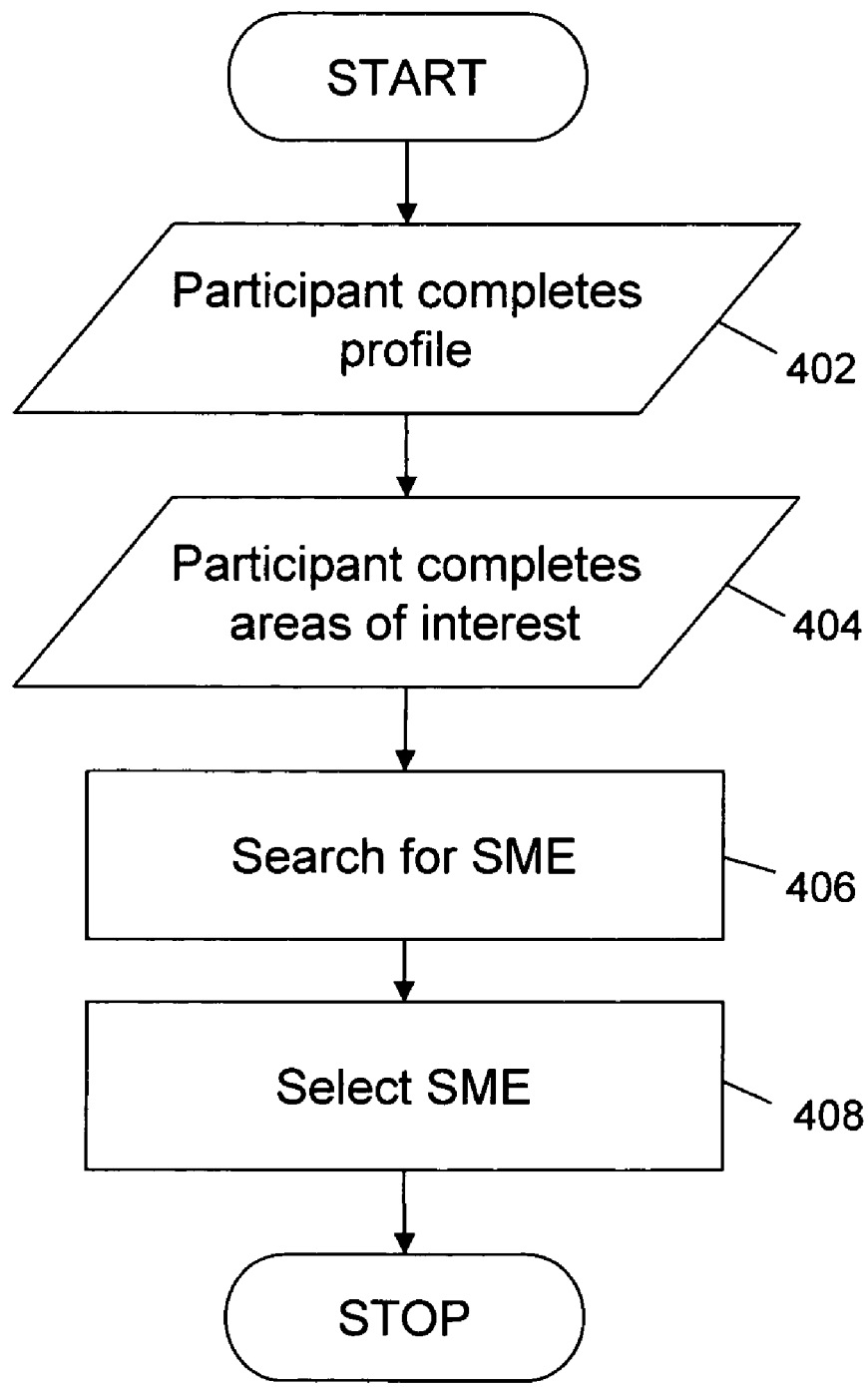
FIG. 4 is a flowchart depicting the steps of assigning a subject matter expert to a participant, in accordance with an embodiment of the present invention.

FIG. 4 is a flowchart depicting the steps of assigning a subject matter expert to a participant, in accordance with an embodiment of the present invention. In order to be assigned to a subject matter expert, a participant first needs to complete the user profile. This is depicted at step 402. At step 404, the participant also inputs areas of interest. This step is required for being assigned to a subject matter expert, because the areas of interest specify the subject matter type to find. SME matching module 204 uses the user profile saved by the participant and the areas of interest and searches for subject matter experts in database 104 based on a specific area of interest and SME availability. This is depicted at step 406. The search results are displayed to the participant, along with details of the subject matter experts. The participant can select the subject matter expert that he/she thinks suits best to the selected area of interest. After a participant is matched with a subject matter expert, the participant can communicate with the subject matter expert. The server provides tools for allowing this communication and these tools are similar to those provided for participant-mentor communication, via communication module 206.

Figure 5:
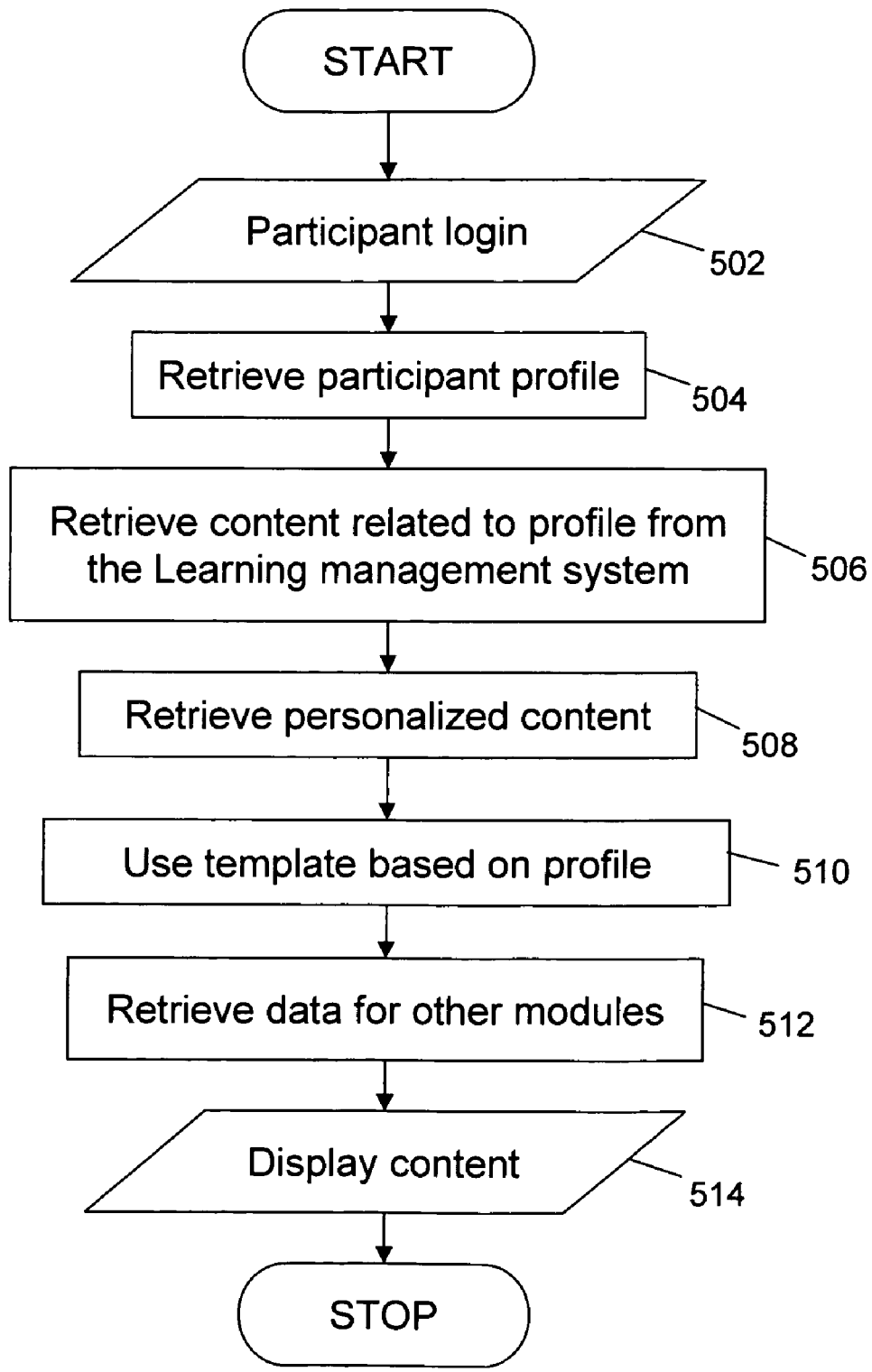
FIG. 5 is a flowchart depicting the steps of presenting a customized portal to a participant, in accordance with an embodiment of the present invention.

FIG. 5 is a flowchart depicting the steps of presenting a customized portal to a participant, in accordance with an embodiment of the present invention. After a participant logs in by providing a username and password, at step 502, the content module 208 retrieves the participants profile from database 104, at step 504. Content module 208 retrieves content from the learning management system that is appropriate for the profile for the participant, at step 506. The learning management system stores content that is meta-tagged with areas of interest and keywords, content module 208 queries the learning management system for such keywords that are extracted from the user profile, including areas of interest, of the participant. In some cases, a mentor or a subject matter expert may have chosen to push out some content for the participant that is logging in. This is stored in the participant's profile. Content module checks to see if such special, personal content is present and if so retrieves it, at step 508. Not only does the system provide customization of the portal content based on the profile of the participant, but it also customizes the layout based on the proficiency of the participant. At step 510, content module 208 determines the template and layout to use for the portal based on the appropriate information in the user profile. After the content module has loaded all the personalized content, data for other modules is read from database 104, at step 512. This personalized content is displayed to the participant as a web page on the participant's terminal.

Figure 6:
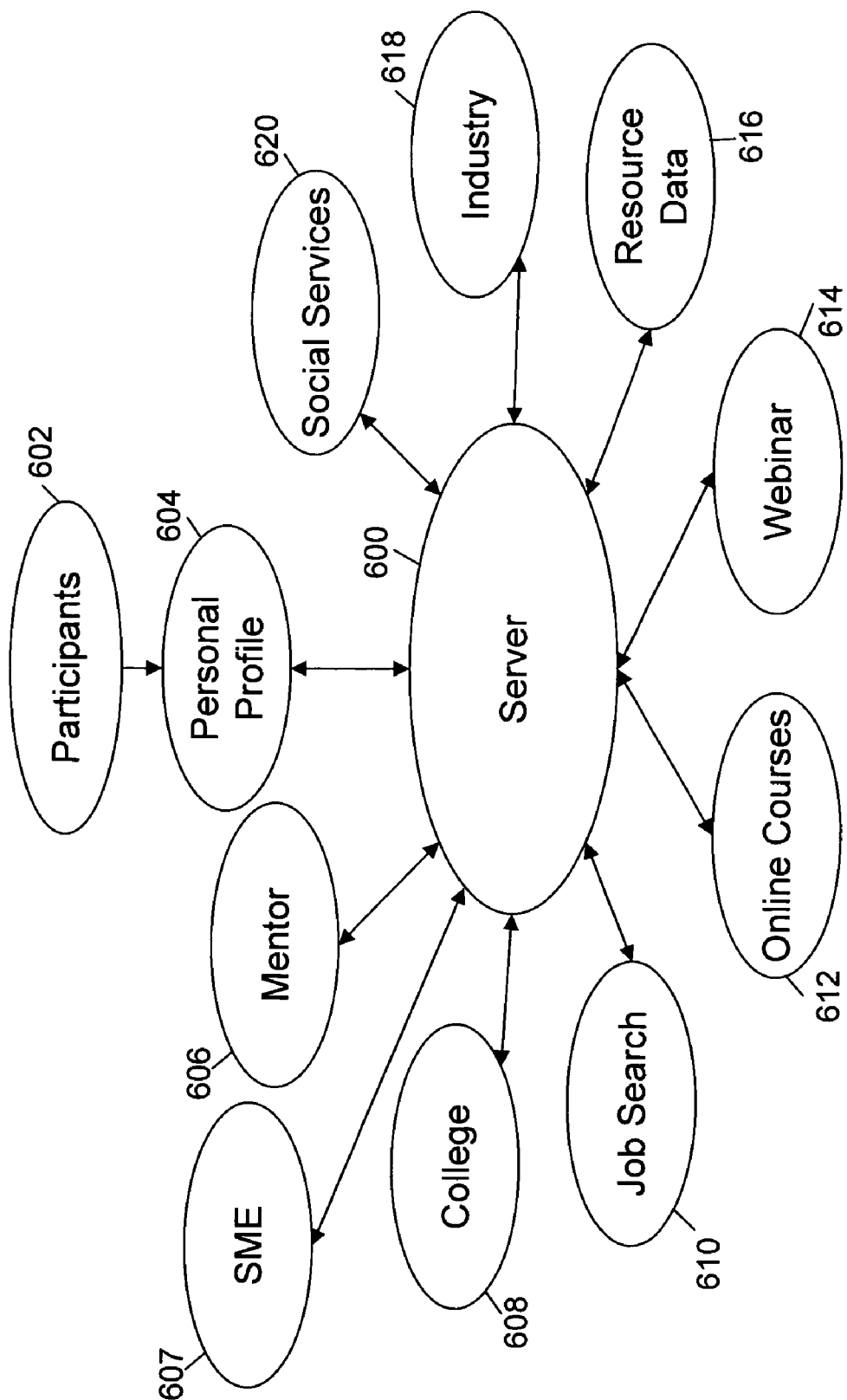
FIG. 6 is a schematic of the various modules and functionality of the system, in accordance with an embodiment of the present invention.

FIG. 6 is a schematic of the various modules and functionality of the system, in accordance with an embodiment of the present invention. Server 600 is an exemplary server that contains server 102 and database 104. Participants 602 create a personal profile 604 that is stored on server 600. The various modules that are available are: Mentor 606, SME 607, College 608, Job Search 610, Online Learning 612, Webinar 614, Resource Data 616, Online Resource Data, Participant Polling, Industry Opportunities 618, and Social Services Opportunities 620. Mentor module 606 links with mentor matching module 202 to match a mentor with the participant 602 based on personal profile 604. Resource Data including College information 608 provides the participant 602 college related information that may be relevant to participant 602 bases on profile 604. In one embodiment, college module 608 provides information such as that provided by state and local college board information resources, such as the College Foundation of North Carolina, for example.

Job Search module 610 provides participant 602 jobs and career related resources from public and private industries. Online courses module 612 provides links to online lectures, e-courses and other online course related information. Webinar module 614 provides participant 602 with webinars that are relevant to participant 602. A webinar is an online seminar that may contain audio and video. Resource data 616 is a data store of information, such as the learning management system, that has been previously described in detail. Industry 618 (and social service) partners provide support to the community by providing mentors, SMEs and job, internship, or job shadowing opportunities links.

FIG. 7 is a schematic of a personalized portal, in accordance with an embodiment of the present invention. The figure shows an exemplary personalized portal 700 that is displayed to a participant. Portal 700 is personalized on the basis of the participant's profile. Personalized portal 700 comprises online courses module 612 and webinar module 614 displayed as course module 702. This module contains links to online courses, seminars, lectures and webinars that are related to a participant's profile and areas of interest. Portal 700 also comprises discussion boards 704. These serve as communication and collaboration tools for a participant. Portal 700 also comprises a notification module 706. This notifies the participants about upcoming events, courses, and other notifications. Polling module 708 is also provided on portal 700. Polling module 708 allows polling information to be collected from multiple participants. It also provides the ability to deliver tests for the completed courses to the participants. A web links module 710 is provided. This provides information to participants on the basis of their profile and areas of interest. The information is usually selected from the learning management system and delivered or pushed to the participants. A quick links module 712 provides links to the participants to collaboration tools such as online chat, voice chat and other collaboration tools available to the participants.

The current invention provides the participants the access to knowledge and resources that they do not traditionally access. The present invention aims to bridge the gap between participants in communities and information or technology. Certain modifications and improvements will occur to those skilled in the art upon a reading of the foregoing description. By way of example, the present invention can be used by college students for attempting to determine interest and career focus. It can also be used by adults for retooling their careers by searching for different career opportunities based on new interests or employment status. The present invention can also be used in schools, for example, by high school students attempting to determine interests and make college decisions. It is also usable by students in other grades to determine interests and course options to pursue. Other uses include applications for learning and skill development, for retirement information and for finding employment opportunities. The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the following claims.

What is claimed is:

1. A method for providing an interactive knowledge based community solution, the community comprising multiple users, each of the multiple users belonging to a user type, the user types comprising participant, mentor, and subject matter expert, the method comprising the steps of:
   (a) associating a user profile with at least one of the multiple users;
   (b) matching a participant user with a mentor user based on user profiles of the participant user and the mentor user;
   (c) matching a participant user with at least one subject matter expert user based on the user profile of the participant user including at least one of an industry identifier and an occupation identifier, and based on the user profile of the at least one subject matter expert user including at least one of an industry identifier and an occupation identifier; and
   (d) providing a computerized terminal interface for allowing at least one user to interact with at least one other user;
   wherein the computerized terminal interface displays personalized content to each participant user, and the displayed personalized content is selected on the basis of at least one of (i) a match between the participant user and a mentor user, and (ii) a match between the participant user and at least one subject matter expert user; and
   wherein each mentor user and subject matter expert user differs from one another.

2. The method of claim 1, further comprising the step of recording a user profile for at least one user of the multiple users.

3. The method of claim 1, further comprising the step of recording at least one of any of a status identifier, industry identifier, occupation identifier, and area of interest for each participant user.

4. The method of claim 3, wherein the step of matching a participant user with at least one subject matter expert user is further based on matching at least one area of interest of a participant user with at least one profile of the at least one subject matter expert user.

5. The method of claim 1, further comprising the step of collecting usage information for at least one user of the multiple users.

6. The method of claim 1, further comprising the step of collecting information from at least one participant user for assessing knowledge of the participant user relating to a selected field.

7. The method of claim 1, wherein the step of matching a participant user with a mentor user is performed automatically after recordation of a user profile of the participant user.

8. The method of claim 1, wherein the step of matching a participant user with at least one subject matter expert user is performed upon request of the participant user.

9. The method of claim 1, wherein the step of providing an interface for allowing at least one user to interact with at least one other user includes allowing interaction between a participant user and mentor user matched with the participant user.

10. The method of claim 1, wherein the step of providing an interface for allowing at least one user to interact with at least one other user includes allowing interaction between a participant user and at least one subject matter expert user matched with the participant user.

11. The method of claim 1, wherein the interface further displays content including at least one of (i) news, and (ii) information relating to current affairs, that is selected on the basis of the user profile of the participant user.

12. The method of claim 1, wherein the interface further displays content including at least one of (i) career-related information and (ii) job-related information, that is selected on the basis of the user profile of the participant user.

13. The method of claim 1, wherein the personalized content includes at least one of (i) online courses, (ii) lectures, (iii) seminars, and (iv) webinars.

14. The method of claim 13, wherein the personalized content is delivered live to the participant user and the interface enables interaction between the participant user and at least one other user concurrent with the live delivery of personalized content.

15. The method of claim 1, wherein the interface allows virtual collaboration between multiple users.

16. The method of claim 1, further comprising the step of providing at least one additional community comprising multiple users wherein at least one user of the at least one additional community interacts with at least one user of the community.

17. The method of claim 1, wherein personalized content is pushed to a participant user by at least one of (i) a mentor user and (ii) a subject matter expert user, for display to the participant user.

18. A system for providing an interactive knowledge based community solution, the community comprising multiple users, each of the multiple users belonging to a user type, the user types comprising participant, mentor, and subject matter expert (SME), the system comprising:

(a) at least one database stored in a non-transitory data storage unit for storing a list of registered users having access to the system and a user profile associated with each user;

(b) an access element for providing access to personalized portals for the registered users;

(c) a computer-implemented mentor matching module for matching a participant user with a mentor user based on user profiles of the participant user and the mentor user;

(d) a computer-implemented subject matter expert matching module for matching a participant user with at least one subject matter expert user based on user profiles of the participant user and the at least one subject matter user each including at least one of an industry identifier and an occupation identifier;

(e) a computer-implemented interface module for at least one user to interact with at least one other user; and (f) a computer-implemented content module for providing each of participant user with personalized content that is selected on the basis of at least one of (i) a match between the participant user and a mentor user, and (ii) a match between the participant user and at least one subject matter expert user;

wherein the mentor user differs from the at least one subject matter expert user.

19. The system of claim 18, wherein the interface module enables inter-user communications including at least one of text-based chat communication, Voice Over Internet Protocol (VOIP) communication, and threaded discussion communication.

20. The system of claim 18, wherein the mentor matching module automatically matches a participant user with a mentor user after a user profile of the participant user is recorded in the at least one database.

21. The system of claim 18, wherein the at least one database stores at least one area of interest for a participant user in a user profile of the participant user.

22. The system of claim 21, wherein the subject matter expert matching module matches a participant user with at least one subject matter expert user on the basis of an area of interest specified in a user profile of the participant user.

23. The system of claim 18, wherein the content module automatically delivers personalized content to each participant user.

24. The system of claim 23, wherein the personalized content includes at least one of (i) online courses, (ii) lectures, (iv) personal growth plans, (v) seminars, and (vi) webinars.

25. The system of claim 23, wherein the personalized content includes at least one of (i) interviews and (ii) lectures with subject matter experts, wherein the personalized content is stored and delivered in any of a video format and an audio format.

26. The system of claim 18, further comprising a module for scheduling delivery of personalized content to a participant user based on a user profile of the participant user.

27. The system of claim 18, wherein the interface module allows at least one user to virtually collaborate with at least one other user.

28. The system of claim 27, wherein the virtual collaboration uses at least one of (i) Voice Over Internet Protocol (VOIP) communication and (ii) application sharing.

29. The system of claim 18, wherein the database stores (i) a list of at least one user from at least one additional community having access to the system and (ii) a user profile associated with the at least one user from the at least one additional community, and the system further comprises an inter-community interface module allowing the at least one user from the at least one additional community to interact with at least one user from the community.

30. The system of claim 18, wherein the at least one database is managed by a system administrator and facilitated by a sponsor.

31. The system of claim 18, wherein the system generates reports on usage and associated value of the systems for the benefit of participants.

32. The system of claim 18, wherein the system identifies job opportunities to participant users.

33. A method for providing an interactive knowledge based community solution, the community comprising multiple users, each of the multiple users belonging to a user type, the user types comprising participant, mentor, and subject matter expert, the method comprising the steps of:
- (a) associating a user profile with at least one of the multiple users;
- (b) matching a participant user with a mentor user based on user profiles of the participant user and the mentor user;
- (c) matching a participant user with at least one subject matter expert user based on the user profile of the participant user including at least one of an industry identifier and an occupation identifier, and based on the user profile of the at least one subject matter expert user including at least one of an industry identifier and an occupation identifier; and
- (d) providing a computerized terminal interface for allowing at least one user to interact with at least one other user;

wherein the computerized terminal interface displays personalized content to each participant user, and the displayed personalized content includes at least one of (i) virtual collaboration between multiple users, (ii) text-based chat communication between multiple users, (iii) remote application sharing between multiple users, (iv) Voice Over Internet Protocol communication between multiple users, (v) a web conference between multiple users, and (vi) a webinar involving multiple users; and wherein each mentor user and subject matter expert user differs from one another.

34. The method of claim 33, wherein the personalized content includes live interactive communication between multiple users.

35. The method of claim 33, wherein the personalized content displayed to a participant user is selected on the basis of the user profile of the participant user.

36. The method of claim 33, wherein the personalized content displayed to a participant user is selected on the basis of at least one of (i) a match between the participant user and a mentor user, and (ii) a match between the participant user and at least one subject matter expert user.

* * * * *